United States Patent Office 3,038,663
Patented June 12, 1962

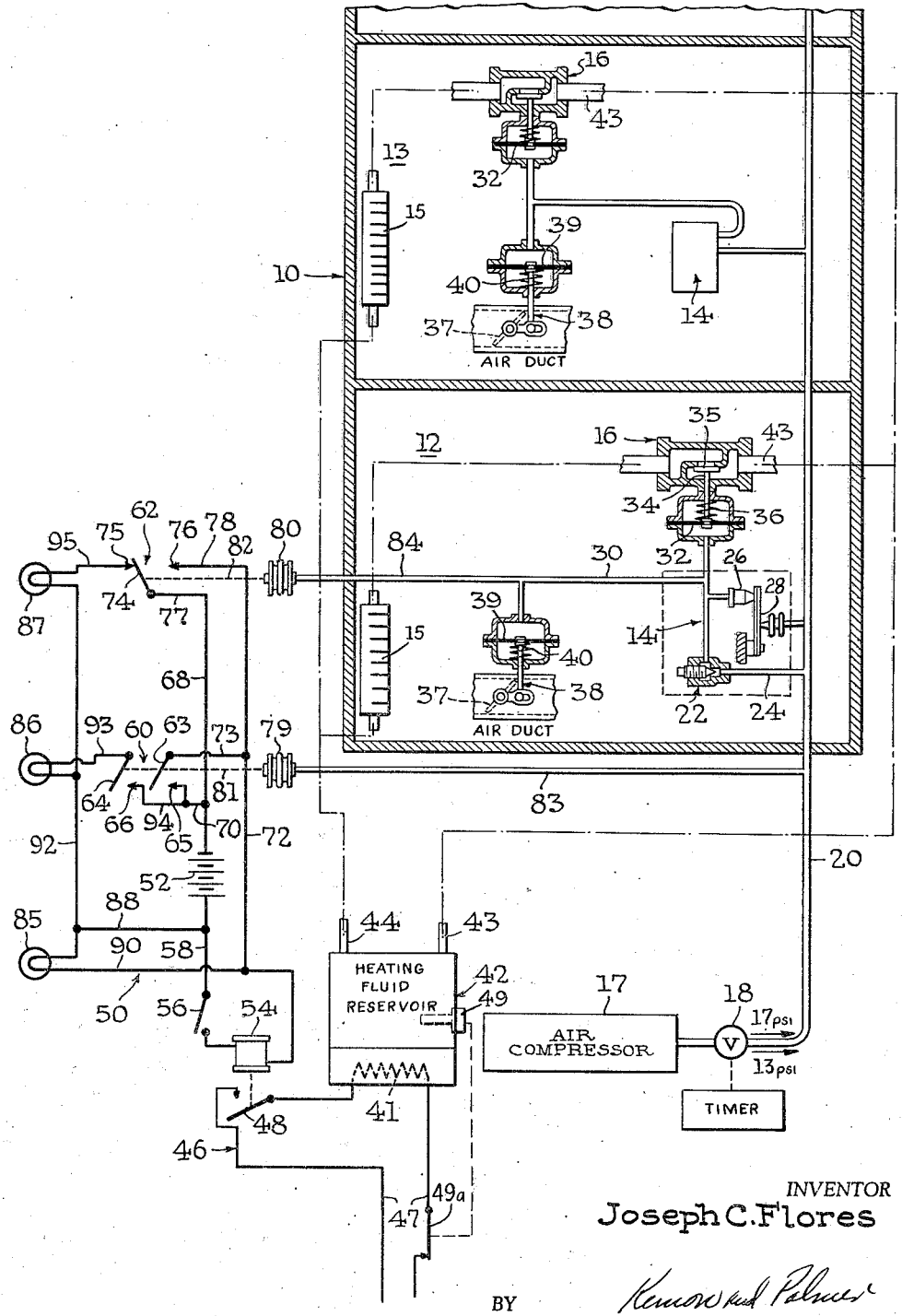

3,038,663
APPARATUS FOR CONTROLLING ROOM
HEATING SYSTEM
Joseph C. Flores, R.D. 2, Saratoga Road,
Fort Edward, N.Y.
Filed Nov. 13, 1959, Ser. No. 852,706
7 Claims. (Cl. 236—46)

This invention relates to an apparatus for controlling room heating systems and more particularly, to a control apparatus for effecting economical operation of a heat generator for supplying heating fluid to rooms in which different temperature ranges are required to be maintained during various periods of time.

In large multi-room buildings such as schools, office buildings, factories and the like, which are used mostly during the daylight hours and normally unoccupied at night, it is common practice to regulate the building heating system in a manner such that the temperature of the various rooms in the building during the day are maintained within a range comfortable to human beings, such as, for example, 70° to 72° F. During the night, however, when the building is unoccupied, the amount of heat supplied to the rooms is cut back, principally as an economy measure, to the extent that room temperature may drop to approximately 60° to 62° F. The precise ranges of temperature, however, as well as the variations between day and night temperatures will depend on any of several circumstances such as the type of building, the size of heating plant used, the climate, the use to which the building is put, among others.

Insofar as the individual rooms in buildings of the type aforementioned are quite large and positioned at various places in the building so that different quantities of heat are necessary to maintain the temperature in all rooms at the same level, it is necessary that each room be provided with a thermostat for independently controlling the admission of heating fluid to the respective rooms. In systems of this type, the use of compressed air and pneumatic thermostats has been found highly satisfactory because of the accuracy obtainable with pneumatic thermostats and perhaps more significantly, the relative simplicity of devices for transducing changes in air pressures to movement of mechanical devices such as valves and the like as compared with other systems.

To heat the various rooms in buildings of the type aforementioned, it is commonly the practice to employ one or more boilers from which hot water or steam is supplied to the room heat exchangers through valves controlled by the room thermostats. In such systems, fuel or power needed to generate the required amount of heat can be and in current practice is saved to some extent by setting back room thermostats at night when the building is unoccupied so as to require less heating fluid. Prior to this invention, however, there has been no satisfactory apparatus by which the room thermostats are interconnected with the central heating plant so that the fuel burners or heat generators are operated only when an insufficient quantity of heating fluid is available in the boiler or heating fluid reservoir to maintain room temperature at the level called for by the thermostats. One of the principal reasons for the lack of a satisfactory device for regulating the heat generator in accordance with room temperature is because of the different types of demands on the central heating system during day and night operation. For example, during the night operation, the burners are needed only to supply enough heating fluid to the rooms to maintain the pre-established range of night temperatures. During the day, however, the central heating system is needed not only to supply heating fluid to the various rooms of the building, but also to supply hot water for such purposes as showers and lavatories in schools and office buildings and for other industrial purposes in factories. Thus, during day operation, it is essential for satisfactory operation in a heating system of this type that the boilers are not cut out merely because the room temperatures are up to the level called for by the room thermostat.

Accordingly, an object of this invention is to provide a new and unique apparatus for controlling the operation of a heat generator for supplying a multi-room building with heating fluid in a highly effective manner so that a minimum of heat is wasted and yet the individual room temperatures maintained within pre-established day and night ranges.

Another object of this invention is to provide an apparatus for controlling a heat generator used for supplying heating fluid to the individual rooms of a school, office building, factory or like buildings in a manner such that only the amount of heating fluid necessary to maintain the room temperatures at a reduced level is generated during night operation while a sufficient amount of heating fluid is generated during daytime operation to maintain the room temperatures at a pre-established elevated range as well as to provide sufficient heat for other purposes such as the heating of water for showers, dishwashing, lavatory and other purposes.

A further object of this invention is the provision of a control apparatus of the type aforementioned which is highly effective to control the operation of a heat generator, inexpensive and easily adapted to preexisting multi-room temperature controls of the type having a pneumatic thermostat, a main air line for feeding compressed air to the thermostat and a branch line for regulating the admission of a heating fluid to the room as called for by the thermostat.

A still further object of this invention is the provision of an apparatus of the type aforementioned which incorporates a signal light system by which an operator is informed not only as to the condition of the various components of the system, but also is made aware during daytime operation of the need for additional heat generating units.

Other objects and further scope of the applicability of the present invention will be apparent from the detailed description given hereinafter. It should be understood, however, that the detailed description, while indicating a preferred embodiment of the invention, is given by way of illustration only since it will demonstrate to those skilled in the art that various changes and modifications can be made without departing from the spirit and scope of this invention.

In general, the aforementioned objects are accomplished by controlling the heat generator in a room heating system of the type having a heating fluid reservoir and a room thermostat to effect continuous operation of the heat generator during the day or other period when most heat is required and operation thereof at night or such period when heat is needed only to maintain a reduced room temperature, in accordance with demand by the room thermostat. The apparatus for effecting such a control is particularly suited for use with pneumatic thermostats of the type which produce a variable pressure in a branch line according to room temperature when supplied with air or the like at constant pressure through a main line and includes a first circuit closable in response to certain main line pressures to operate the heat generator regardless of room temperature. A second circuit for operating the heat generator when closed is provided and is responsive to branch line pressures so that the heat generator is operated thereby whenever the heating fluid available in the reservoir is insufficient to maintain desired room temperatures as established by the thermostat. In operation, main line pressure is regulated to keep the first circuit closed during the day and thus enables continuous operation of the heat generator. At night, the main line pressure is adjusted to open the first circuit and leave operation of the heat generator under control of the second circuit in accordance with demand for heating fluid by the room thermostat. Further, the circuits are equipped with three signal lamps which function to provide an indication of (1) when the heat generator is in operation, (2) when the first circuit is closed and when the second circuit is closed, and (3) indicating when more heat generation is needed to supply adequate heating fluid to the rooms during day operation.

A more complete understanding of the new improved control apparatus of this invention and its operation may be had by reference to the accompanying drawing in which the apparatus is shown schematically tied in to a multi-room temperature control system of the type incorporating pneumatic thermostats.

The building adapted to be heated by the system controlled by the apparatus of this invention is designated in the drawings by the numeral 10, having a plurality of rooms, though only two rooms 12 and 13 are shown. In accordance with standard practice in buildings of the type aforementioned, each room is provided with a pneumatic thermostat 14 for regulating the admission of a heating fluid such as hot water or steam to a suitable radiator or heat exchanger 15 through a valve 16.

The pneumatic thermostats 14 may be any of several commercially available types which use compressed air developed by suitable air compressor 17 supplied through a regulator 18 and a main line 20 at an even pre-established pressure. Although the structure of pneumatic thermostats of the type contemplated is quite complex, the basic operating components thereof generally include a restriction 22 connected to the main line by a conduit 24, and a nozzle or bleed port 26 regulated by any suitable thermostatic element such as a bi-metal strip 28. A branch line 30 is thus established on the same side of the restriction 22 as the nozzle 26 in which pressures are maintained which correspond to room temperature. This correlation of branch line pressures to room temperature is effected by arranging the bimetal element 28 such that at the desired room temperature, the nozzle 26 is closed to establish a relative high branch line pressure. When, however, the room temperature drops, the element 28 moves away from the nozzle 26 bleeding air therefrom and thus reducing the branch line pressure. Though any pneumatic thermostat of the type which produces a variation in branch line pressure corresponding to variation in room temperature may be used with the control apparatus of this invention, thermostats of the type disclosed in U.S. Patent No. 2,326,226 or 2,828,077 are preferred since adjustment thereof from one range of temperatures to another may be brought about merely by changing the main line pressure.

Because of the corresponding decrease in branch line pressure to decrease in room temperature, the regulation of the valve 16 is easily effected by a diaphragm 32 to which a valve stem 34 and valve head 35 is affixed, exposed to branch line pressure on one side and on the other side by a spring 36. In this manner, so long as a sufficient amount of air pressure exists in the branch line 30, the diaphragm is urged against the bias of spring 36 to seat the valve head 35 and thus prevent the admission of heating fluid to the room 12. Should the branch line pressure fall to a predetermined adjustable amount, however, the spring 36 will overcome the effect of pressure on the diaphragm 32 to unseat the valve head 35 and thereby open the valve 16 to admit heating fluid to the room. Similarly room 13 as well as the other rooms in the building are maintained at the desired temperature.

Also, each room is provided with a fresh air duct controlled by a butterfly valve 37 controlled through suitable linkage 38 connected to a diaphragm 39. Like the diaphragm 32 of the valve 16, the diaphragm 39 is exposed on one side to the pressure in branch line 30 and on the other side to the bias of a spring 40. In this instance, however, the linkage 38 is arranged so that the butterfly valve 37 will open at high branch line pressures and close at low branch line pressures. In other words, the heating fluid valve 16 and the air valve 37 coact to maintain proper room temperatures by controlled admission of heating fluid and fresh air respectively.

To supply heating fluid to the various rooms in the building through the valves 16, a heat generator 41 is provided for supplying heat to a heating fluid reservoir 42 which may be a hot water tank, steam boiler or the like. From the reservoir 42, heating fluid is transmitted through suitable piping 43 to the valves 16 and thus to the room radiators or other heat exchangers 15. A line 44 is connected to the heating fluid reservoir 42 for returning expended heating fluid thereto. As shown in the drawings, the heat generator 41 is in the form of electrical resistance heating element in an electrical circuit 46 fed by a pair of power lines 47 and having a circuit breaker or switch 48. It is to be understand, however, that any suitable heat generator which is responsive to electrical or other energy may be used with the control apparatus of this invention. For example, the heat generator may be a liquid or gaseous fuel burner operated in response to the closing of the circuit 46, an electrically responsive solid fuel burner equipped with an electrical fuel feed means such as a stoker or it may be any other suitable burner. Also, it will be understood by those familiar in the art that the heat generator may be provided with limit controls whereby operation thereof will cease when a predetermined amount of heating fluid (e.g. steam pressure) is generated. Thus, a sensing device 49 which may detect unsafe conditions such as abnormal temperatures or pressures is arranged to open a switch 49a when these abnormal conditions are reached, limiting operation of the heat generator to within a safe range. This control feature is affected in no way by room temperature, however, and therefore forms no part of the present invention.

The new and improved control apparatus of this invention is indicated generally by the numeral 50 in the drawings and includes a suitable source of electrical energy such as a battery 52 and an electro-magnetic relay 54 for closing the switch 48 in the heat generator circuit 46, when current is passing through the relay 54. It will be understood, however, that relay 54 is merely incidental to the control apparatus of this invention since it will be obvious to those familiar in this art that the power lines 47 could be used in place of the battery 52 and thereby eliminate the need for the relay 54. The relay 54 is connected to one side of the battery 52 through a master control switch 56 by a line 58. The other half of the relay circuit may be completed by closing either of first and second pneumatically actuated switches 60 and 62 respectively. The switch 60 is of the double-pole, single throw variety having a pair of contact blades 63 and 64 and a pair of corresponding contact terminals 65 and 66 respectively. The terminal 65 is connected to a line 68 leading to the other side of the battery by a tap 70 while the blade 63 is connected to a line 72 leading from the other side of the relay 54 by a tap line 73. Accordingly, a circuit is completed through the relay 54 and battery 52 to close the heat generator circuit 46 when the blade 63 engages the contact 65, assuming the master switch 56 to be closed.

A relay circuit may also be made through the switch 62 which is of the single-pole, double-throw variety and includes a contact blade 74 engageable with either one of a pair of contact terminals 75 and 76. The blade 74 is connected by a line 77 to the line 68 while the terminal 76 is connected by the line 78 to the line 72 so that current is available to the relay 54 when the blade 74 makes contact with the terminal 76.

Both of the switches 60 and 62 are actuated by bellows 79 and 80 respectively through suitable mechanical linkage 81 and 82. Although the precise operation of the bellows 79 and 80 and switches 60 and 62 will be understood more fully from the description of operation which follows below, it will be noted that the bellows 79 is connected to the main line 20 by a conduit 83 while the bellows 80 is connected to the branch line 30 by a line 84. Also, it will be noted that the bellows 80 is connected to the branch line of that thermostat 14 located in the outermost room 12 in the building 10. In other words, the bellows 80 is connected with the thermostat located in the building room, which because of its location or other reasons requires most heat to maintain a satisfactory range of temperatures therein.

For the purpose of indicating the operating characteristics of the control apparatus 50, three pilot lamps 85, 86, and 87 are provided. The lamp 85 is arranged to be lit whenever the heat generator 41 is operating, and accordingly, is connected across lines 58 and 72 by leads 88 and 90 respectively. Thus, it will be understood that whenever the circuit to the relay 54 is completed to operate the heat generator 41, the lamp 85 will also be in a completed circuit and thus be lit. The lamp 86, on the other hand, is arranged to inform the operator of the system when the switch 60 is closed. Accordingly, it is connected on one side to the line 92 which is a continuation of the lead 90 through the lamp 85 and at the other side to the blade 64 of the switch 60 by a lead 93. It will be noted that the double pole single throw switch 60 is provided with a jumper wire 94, which upon closing of the switch 60 to engage the blade 64 with the contact terminal 66 thereof completes a circuit through the lamp 86. The lamp 87 is intended to be lit when the blade 74 of the switch 62 is engaged with the terminal 75 or when the heat generator is not operating under the control of the switch 62. Therefore, it is connected to the line 92 on one side and on the other to the contact terminal 75 of the switch by a lead 95.

As mentioned above, the control apparatus of this invention is intended to be used where the room temperature is maintained at one pre-established level during certain periods of time and at other temperature ranges during periods when the building is unoccupied. Assuming, by way of example, that the building 10 is a school and that the room 12 therein is so disposed as to require more heating fluid to maintain the pre-established temperature ranges than the other rooms in the building, the day room temperature is desirably maintained in the neighborhood of 70° to 72° F., while the night room temperature may be set back to approximately 60° to 62° F. without any harmful results and perhaps more significantly without imposing too great a load on the central heating system to elevate the room temperature prior to use in the morning. For this reason, the thermostats 14 are preferably of the type which may be set to maintain day and night temperatures in the ranges aforementioned by merely changing the air pressure in the main line 20. To obtain this change in thermostat settings, it is common practice to use a main line pressure of approximately 13 p.s.i. during day operation and a night main line pressure of approximately 17 p.s.i. though it is understandable that other specific main line pressures can be used.

Since the pressure in the branch line 30 corresponds to the room temperature because of the bleed port 26 being controlled by the thermostatic element 28, the heating fluid valve may be adjusted to supply heating fluid to the room whenever the temperature drops below the aforementioned day and night ranges. For example, it has been found that a branch line pressure of more than 8 p.s.i. will be effective to close the valve 16 when the room temperature is above 70° during the day setting of the thermostat. At the night setting of the thermostat, the same pressure of 8 p.s.i. corresponds to a room temperature of approximately 64° F.

The bellows 79 which actuates the switch 60 is adjusted to contract and thereby close the switch when main line pressure is below approximately 14½ p.s.i. Thus, in a system using a man line pressure of 13 lbs. during the day and 17 lbs. (p.s.i.) at night, it will be understood that the switch 60 will be closed during daytime operation and open when the bellows 79 is exposed to a night operating pressure of 17 p.s.i. The bellows 80 which controls the switch 62 on the other hand is arranged to be extended under the influence of a branch pressure which exceeds approximately 6 p.s.i. when used in a system of the type aforementioned and contracted when the branch line pressure drops to approximately 4 p.s.i. Thus, the switch blade 74 of the switch 62 makes contact with the terminal 75 under branch pressures in excess of 6 p.s.i. and with the contact terminal 76 under branch pressures of 4 p.s.i. or less. It is contemplated, however, that the specific pressure settings aforementioned may be varied without departing from the scope of this invention, and it will be understood that they are given merely to facilitate a clear understanding of the invention.

The spring 40 biasing the diaphragm 39 in a direction tending to close the air valve 37 is adjusted so that when the room temperature exceeds the pre-established ranges aforementioned, the air valve 37 will open to admit ventilating air to the room in which it is located. Thus, since the branch line pressure will approach main line pressure when the temperature in the classroom exceeds the pre-established day and night ranges, the branch line pressure will be sufficient to overcome the bias of spring 40 and open the air valve 37.

The operation of the system during the night is begun by adjusting the valve 18 so that main line pressure is approximately 17 p.s.i. This adjustment may be manual or preferably may be automatic in the sense that it is controlled by a suitable time clock mechanism. Upon obtaining a main line pressure of 17 p.s.i., the bellows 79 connected to the main line 20 through the line 83 will immediately expand to open the switch 60. When this occurs, the circuit for the relay 54 will be opened to open the heat generator circuit 46, and thus cut out the heat generator 41. Also, at this point both the pilot lamps 85 and 86 will go out to inform the operator that the heat generator 41 is not operating and that the switch 60 is open.

At the time the mainline pressure is changed to 17 p.s.i., the room temperature will be in the vicinity of 72° F. and accordingly the branch line pressure sufficiently high to keep the valve head 35 seated and the diaphragm 80 extended so that the switch blade 74 makes contact with the terminal 75, thereby lighting the pilot lamp 87. Because no heating fluid is being admitted to the room 12, the temperature therein will gradually decrease during the night until a temperature of approximately 64° F. is reached. At this point, the branch line pressure approaches 8 p.s.i., and therefore the valve head 35 begins to unseat under the influence of the spring 36. When the temperature drops to approximately 62° F., the branch line pressure reaches 6 p.s.i. and the valve 16 is fully opened admitting heating fluid to the room. It will be noted at this point that since the bellows 80 is under a branch line pressure of at least 6 p.s.i., the switch 62 is restrained from closing the relay circuit by making contact with the terminal 76 and therefore the heat generator 41 remains inoperative. It will remain in this position providing there is a sufficient amount of heating fluid in the reservoir 42 to raise the room temperature back to the pre-established range of 62° to 64°, whereupon the valve head 35 again seats under the influence of an increased branch line pressure. If, however, there is an insufficient amount of heating fluid in the boiler or heating fluid reservoir 42, the branch line pressure will continue to decrease due to the lack of sufficient heating fluid to raise the room temperature to 64° as required by the thermostat. When it decreases to approximately 4 p.s.i., the bellows 80 contracts to move the switch blade 74 into engagement with the terminal contact 76, thereby completing the relay circuit and again energizing the heat generator 41. The switch 62 will remain in this position until a sufficient amount of heating fluid is generated to elevate the room temperature again to above 64° F. during night operation.

As soon as the switch blade 74 moves from the contact terminal 75 to the terminal 76, the pilot lamp 87 will go out and since the relay is complete to operate the heat generator 41, the pilot lamp 85 will again be lit.

The operation of the thermostat 14, valve 16 and switch 62 will continue throughout the night in the manner aforementioned to maintain the room temperature in the vicinity of 62° to 64° F. Also, it will be understood that the room 13 will be heated in like fashion as well as the remaining rooms in the building, and since the room 12 is so located or constructed to require most heat, it is only necessary that the thermostat therein be used to control the heat generator 41 since a sufficient amount of heating fluid will be generated in this manner to supply the other relatively warmer rooms of the building.

At some predetermined time in the morning when it is desired to make the change from night to day operation, the regulator 18 is again adjusted to change main line pressure from 17 p.s.i. back to 13 p.s.i. This change in main line pressure not only brings about a change in the thermostat settings, but also causes the bellows 79 to contract and thereby close the switch 60 to operate the heat generator 41. The operation of the valve 16 to admit heating fluid to the room in the building will operate substantially as described above for the night operation, except that during the day setting, a branch line pressure of 8 p.s.i. corresponds to approximately 70° F. Since main line pressure is constant throughout the day, the heat generator 41 is operated continuously in response to its own limit controls 49 throughout the daytime operation. This is extremely important in buildings of the type aforementioned, since the demand for heat during the day is required to generate hot water for showers, lavatories, cafeteria use and many other purposes than for maintaining room temperature.

It will be noted that under normal daytime operation, the bellows 80 will be extended so that the switch blade 74 contacts terminal 75 to light the pilot lamp 87 because of there being a sufficient amount of heat supplied to the room to keep the branch line pressure over 6 p.s.i. The pilot lamp 87 thus performs another important feature of informing an operator as to when the heat generator 41 is supplying an insufficient amount of heating fluid to maintain the room temperatures at 72° F. during the day. This is brought about by the fact that if an insufficient amount of heating fluid is being generated, the branch line pressure will drop below the 4 to 6 p.s.i. necessary to keep the switch blade in contact with the terminal 75. When this occurs, the circuit to the lamp 87 will open, turning off the lamp and thereby letting the operator know that more heat generators are needed. In practice, buildings such as schools are most commonly equipped having a plurality of steam boilers for supplying steam to the rooms to be heated. Thus, so long as the lamp 87 is lit, the number of boilers can be reduced to a minimum and upon the lamp 87 going out, the number of boilers increased until the sufficient heat generating facility is obtained.

In view of the foregoing description, it will be understood by those familiar in this art that the foregoing objectives are completely fulfilled by the control apparatus of this invention. It is to be recognized that, because of the switch 62 operating to control the heat generator during the night time operation, only that amount of heating fluid is produced which is necessary to maintain the relatively low night time room temperatures. Yet, because of the switch 60 completing a circuit for operation of the heat generator 41, whenever main line pressure is reduced to below a predetermined amount, the night control switch 62 in no way interferes with continuous operation of the heat generator 41 during the day when it is needed for other heating purposes. In other words, incorporation of the control apparatus of this invention into a heating system of the type aforementioned effects a substantial savings in fuel by effectively controlling the heat generator during night time operation without in any manner interfering with effective day operation thereof. Moreover, the indicating facility available because of the pilot lamp 87 and its association with the switch 62 and accordingly the branch line pressure from room thermostats 14 is invaluable to efficient operation of central heating plants where a plurality of heat generating units are available.

Since many possible changes may be made in the control apparatus of this invention as described above, and since changes will be suggested to those familiar in this art by the above description, it is to be distinctly understood that the foregoing is given by way of illustration only, and that the true spirit and scope of this invention is to be determined by the appended claims.

I claim:

1. A heating system adapted to maintain different pre-established temperature ranges in a room during two different periods of time comprising: a heat generator; a heating fluid reservoir operatively associated with said heat generator; means for supplying heating fluid from said reservoir to the room; a room thermostat; a main line for supplying operating medium to said thermostat at different pressures during the different periods of time; means for establishing different pressures in said main line during the two different periods of time; a branch line extending from said thermostat for controlling said heating fluid supply means by operating medium pressures corresponding to the room temperature; means controlled by pressure in said main line for enabling constant operation of said heat generator during one period of time; and means controlled by pressures in said branch line for operating said heat generator during the other period of time in response to demands for heating fluid by said thermostat in excess of that available in said heating fluid reservoir.

2. The heating system recited in claim 1 in which said means for operating said heat generator comprises: a source of electrical energy; a first circuit including said source, switch means, and means operable by pressures in said main line for actuating said switch means; and a second circuit including said source, switch means, and means operable by pressures in said branch line for actuating said last mentioned switch means.

3. The heating system recited in claim 1 including a first indicator operative in response to operation of said heat generator; a second indicator operative in response to operation of said heat generator by said means controlled by said main line pressure; and a third indicator operative in response to operation of said heat generator by said means controlled by said branch line pressures.

4. In a room heating system of the type having a heat generator operative in response to electrical energy, a pneumatic room thermostat, a main air line for feeding compressed air to the thermostat and a branch line leading from the thermostat to a device for controlling the admission of heating fluid to a room, an apparatus for controlling said heat generator comprising: a source of electrical energy; first and second electric circuits for connecting said source to said heat generator including first and second switches respectively; means for closing said first switch in response to air pressure in said main air line; means for closing said second switch in response to air pressure in said branch line; means for regulating the pressure of compressed air in the main line; means for closing said first circuit in response to predetermined main line pressures to enable continuous operation of said heat generator, and for opening said first circuit in response to main line pressures out of said predetermined range; and means for closing said second circuit in response to a predetermined branch line pressure to operate said heat generator in accordance with the demand for heating fluid as established by said thermostat.

5. The apparatus recited in claim 4 including a first pilot lamp energized in response to operation of said heat generator; a second pilot lamp energized in response to the completion of said first circuit; and a third pilot lamp energized in response to opening of said second circuit.

6. A heating system for a room comprising: a heat generator operative in response to electrical energy; a heating fluid reservoir operatively associated with said generator; a pneumatic room thermostat; a main air line for feeding compressed air to said thermostat; a valve for controlling the admission of heating fluid to the room; means for transmitting heating fluid from said reservoir to said valve; a branch line connecting said thermostat to said valve to control said valve under the influence of air pressure in said branch line as varied by said thermostat in accordance with room temperature; means for regulating air pressure in said main line; a source of electrical energy; first and second electric circuits for connecting said source to said heat generator; means for closing said first circuit in response to a predetermined range of pressures in said main line; and means for closing said second circuit in response to pressure in said branch line, whereby said first circuit is operable to permit continuous operation of said heat generator under the control of air pressure in said main line and said second circuit is operable to control the operation of said heat generator under the control of air pressure in said branch line in response to heat demand as established by said thermostat in excess of heat available in said heating fluid reservoir.

7. The combination recited in claim 6 comprising: an air duct valve; and means operative in response to branch line pressures to open said valve for admitting fresh air to the room when the room temperature rises above the pre-established range called for by said thermostat.

References Cited in the file of this patent

UNITED STATES PATENTS

| | | |
|---|---|---|
| 1,939,916 | Otto | Dec. 19, 1933 |
| 2,009,674 | Otto | July 30, 1935 |
| 2,295,149 | Adams et al. | Sept. 8, 1942 |